(12) United States Patent
Lehto et al.

(10) Patent No.: US 10,752,344 B2
(45) Date of Patent: Aug. 25, 2020

(54) REMOVING BLADE CUFF BUSHINGS

(71) Applicant: Sikorsky Aircraft Corporation, Stratford, CT (US)

(72) Inventors: Ryan Lehto, Crowley, TX (US); Sven Roy Lofstrom, Irving, TX (US)

(73) Assignee: SIKORSKY AIRCRAFT CORPORATION, Stratford, CT (US)

( * ) Notice: Subject to any disclaimer, the term of this patent is extended or adjusted under 35 U.S.C. 154(b) by 312 days.

(21) Appl. No.: 15/297,060

(22) Filed: Oct. 18, 2016

(65) Prior Publication Data

US 2018/0104751 A1    Apr. 19, 2018

(51) Int. Cl.
| | |
|---|---|
| *B23D 51/02* | (2006.01) |
| *B23D 49/00* | (2006.01) |
| *B23D 51/08* | (2006.01) |
| *B64F 5/00* | (2017.01) |
| *B64C 27/48* | (2006.01) |
| *B64F 5/40* | (2017.01) |

(52) U.S. Cl.
CPC ............... *B64C 27/48* (2013.01); *B64F 5/40* (2017.01)

(58) Field of Classification Search
None
See application file for complete search history.

(56) References Cited

U.S. PATENT DOCUMENTS

| | | | |
|---|---|---|---|
| 7,434,328 B2 | 8/2008 | Landino et al. | |
| 8,800,145 B2 | 8/2014 | Mukherji et al. | |
| 9,156,149 B2 | 10/2015 | Cooper | |
| 2001/0015119 A1* | 8/2001 | Carter | B23D 49/002 83/54 |
| 2007/0280797 A1* | 12/2007 | McDaniel | B23B 47/287 408/115 R |
| 2013/0177422 A1* | 7/2013 | Bianchi | B29D 99/0028 416/146 R |

FOREIGN PATENT DOCUMENTS

WO   WO-2016060906 A1   4/2016

* cited by examiner

*Primary Examiner* — Brian D Keller
(74) *Attorney, Agent, or Firm* — Cantor Colburn LLP

(57) ABSTRACT

A tool for removing a bushing from a workpiece includes a tool body, a first reference, and a second reference for positioning the tool body on a workpiece. A saw slot is defined through the tool body to provide access to the workpiece for a saw blade. A saw guide is proximate the saw slot, the saw guide arranged to position a saw blade in a cutting plane spaced apart from the workpiece for removing a segment of a bushing fixed to the workpiece relative to the first and second references.

12 Claims, 5 Drawing Sheets

REMOVING BLADE CUFF BUSHINGS

BACKGROUND OF THE INVENTION

1. Field of the Invention

The present disclosure relates to rotary blades, and more particularly to disassembling rotary blades for rotorcraft like helicopters.

2. Description of Related Art

Clevis joints are commonly used to transfer load between components, such as between hubs and rotor blades in helicopter rotor systems. Such clevis joints generally include a tang disposed on the rotor hub and received within a clevis on the rotor blade. A fastener, like a pin or rod, seats within the clevis and extends through the tang such that force exerted on the rotor blade transfers between the clevis and the tang as the rotor assembly rotates during flight. The clevis may form part of a blade cuff or other component. Bushings typically seat within the clevis, the bushings limiting wear during operation and offering protection to the clevis structure during installation and/or removal of the blade.

During disassembly or overhaul of a rotor blade it can be necessary to remove the bushing from the clevis. Some clevises can have insufficient space to remove the bushing from the clevis due the height of the gap provided for the tang, which may be axially shorter than the bushing in the adjacent clevis structure. Removing the bushings can require exposing a portion of the bushing, severing a segment of the exposed bushing portion, and thereafter removing the remaining portion of the bushing. The tool used to sever the bushing must be controlled when severing the exposed bushing portion to avoid contacting the clevis or blade cuff.

Such conventional methods and systems have generally been considered satisfactory for their intended purpose. However, there is still a need in the art for improved tools and methods of removing bushings. The present disclosure provides a solution for this need.

SUMMARY OF THE INVENTION

A tool for removing a bushing from a workpiece includes a tool body, a first reference, and a second reference for positioning the tool body on a workpiece. A saw slot is defined through the tool body to provide access to the workpiece for a saw blade. A saw guide is arranged proximate the saw slot to position a saw blade in a cutting plane spaced apart from the workpiece for cutting an exposed portion of a bushing fixed to the workpiece relative to the first and second references.

In certain embodiments, the first and second references can be arranged to mount the tool body to a workpiece. Each of the each of the first and second references can include a pin, spaced apart from one another. The pins can be arranged to mount the tool body to a workpiece with the saw guide positioned for correct placement of the cutting plane relative to the workpiece. The first and second references can disposed on laterally opposite sides of a longitudinal axis of the workpiece.

In accordance with certain embodiments, a locking element can be threadably received within the tool body to fix the workpiece relative to the tool body. The locking element can alternatively or additionally fix the tool body longitudinally relative to the workpiece. The locking element can fix the tool body laterally relative to the workpiece. A slider bar can be mounted to the tool body and longitudinally spaced apart from the saw slot define a boundary of the cutting plane.

It is also contemplated that, in accordance with certain embodiments, the saw guide can include a pair of rails arranged on opposite sides of the saw slot. The rails can be angled or parallel to a longitudinal axis of the workpiece to position the saw blade, e.g., a reciprocating saw blade, along a cutting plane spaced apart from the workpiece. The rails and tool body surface adjacent the rails can define a keyway, open on an end, for mounting a carriage for the saw, to the tool body by sliding a saw into an end of the keyway.

A bushing removal tool includes a tool body as described above. The tool includes a pair of rails on opposite sides of the saw slot arranged to mount the saw and allow movement of the saw in parallel to the length of the rails. A slider bar slides into the tool body and is longitudinally spaced apart from the cutting plane to separate the saw blade from a workpiece on an opposite side of the slider bar while the saw moves in parallel with the rails. The workpiece can include a blade cuff with an exposed bushing portion extending from the blade cuff. The tool can be registered to the blade cuff such that the cutting plane is spaced apart from the blade cuff and intersects the exposed bushing portion.

A method for removing a bushing from a workpiece includes mounting a tool body to a workpiece using at least two references to positively position the tool body relative to the workpiece. A saw is mounted to the tool body such that a saw blade extends through a saw slot defined through the tool body. The saw is then slid across the tool body and along a cutting plane spaced apart from the workpiece, the saw blade forming a cut in a bushing fixed relative to the workpiece without contacting the workpiece.

In certain embodiments, the method can include displacing the bushing relative to the workpiece such that the bushing intersects the cutting plane. A slider bar can be mounted to the tool body. Sliding the saw across the tool body can include sliding the saw across the tool body until the saw abuts the slider bar. Once the cut is made a remaining portion of the bushing can be displaced from the workpiece.

In accordance with certain embodiments, the saw slot can be a first saw slot, the cutting plane can be a first cutting plane, and the bushing can be a first bushing. The saw can be removed from the tool body, flipped, and mounted to the tool body such that the saw blade extends through a second saw slot. The saw can thereafter be slid across the tool body along a second cutting plane spaced apart from the workpiece to form a cut in a second bushing fixed relative to the workpiece.

It is also contemplated that, in accordance with certain embodiments, the method can include displacing the second bushing relative to the workpiece such that the second bushing intersects the second cutting plane. Once cut, a remaining portion of the second bushing can be displaced from the workpiece subsequent to sliding the saw along the tool body.

Removing the bushing from the workpiece can accompany disassembly of a workpiece that is a blade cuff. The bushing can be swaged within the blade cuff prior to disassembly, and removed from the blade cuff subsequent to disassembly of the blade cuff.

These and other features of the systems and methods of the subject disclosure will become more readily apparent to those skilled in the art from the following detailed description of the preferred embodiments taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, embodiments thereof will be described in detail herein below with reference to certain figures, wherein.

DETAILED DESCRIPTION OF THE PREFERRED EMBODIMENTS

Figure 1:
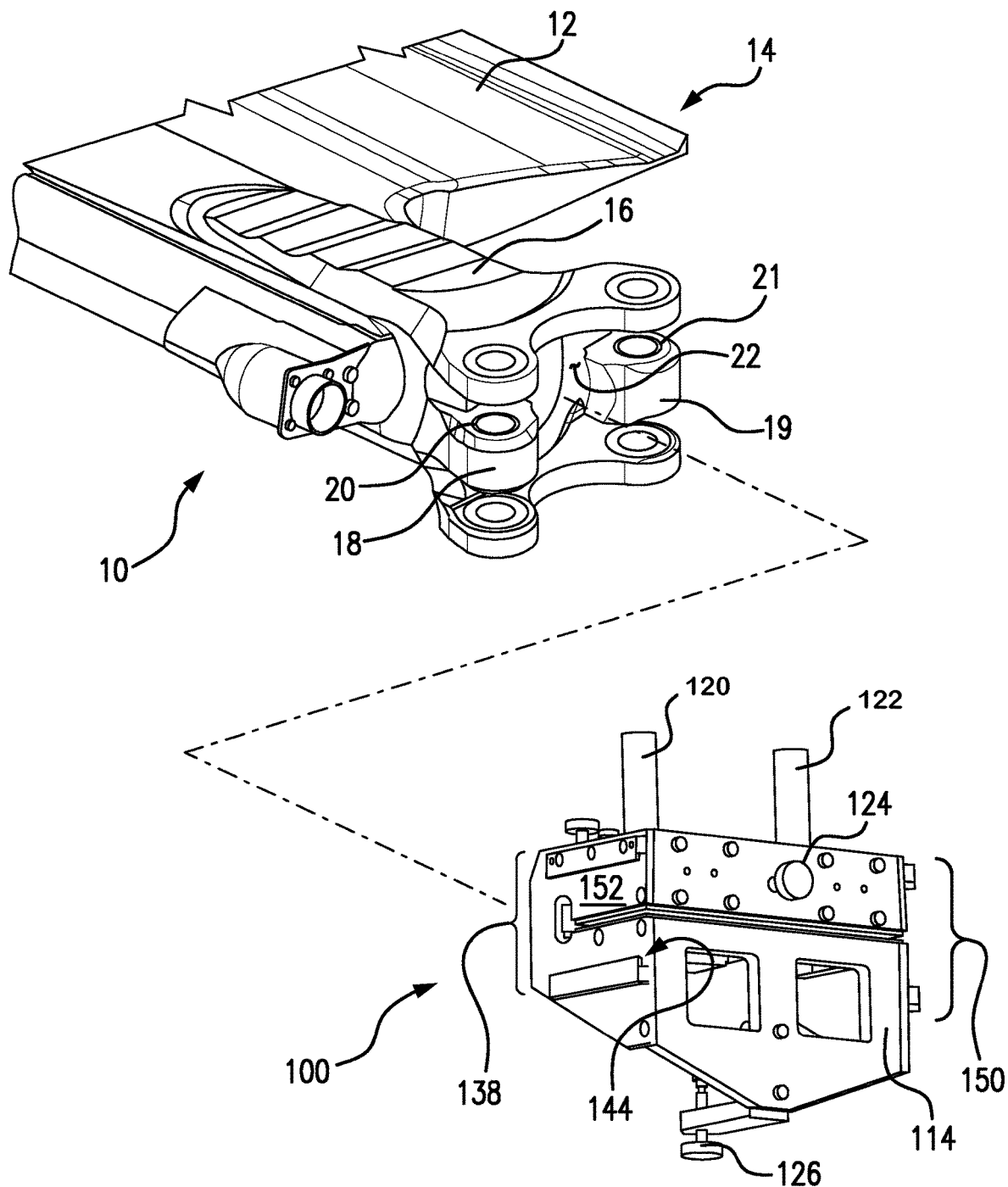
FIG. 1 is a perspective view of a helicopter rotor blade and bushing removal tool, showing a blade cuff fixed to an inboard end of the rotor blade and the bushing removal tool exploded from the blade cuff.

Reference will now be made to the drawings wherein like reference numerals identify similar structural features or aspects of the subject disclosure. For purposes of explanation and illustration, and not limitation, a perspective view of an exemplary embodiment of a bushing removal tool constructed in accordance with the present disclosure is shown in FIG. 1 and is designated generally by reference character 100. Other embodiments of bushing removal tools and related methods of removing bushings in accordance with the disclosure, or aspects thereof, are provided in FIGS. 2-5, as will be described. The systems and methods described herein can be used to safely remove bushings from workpieces, such as bushings from blade cuffs of helicopter main rotor blades, though the present disclosure is not limited to main rotor blades or to helicopters in general.

Figure 2:
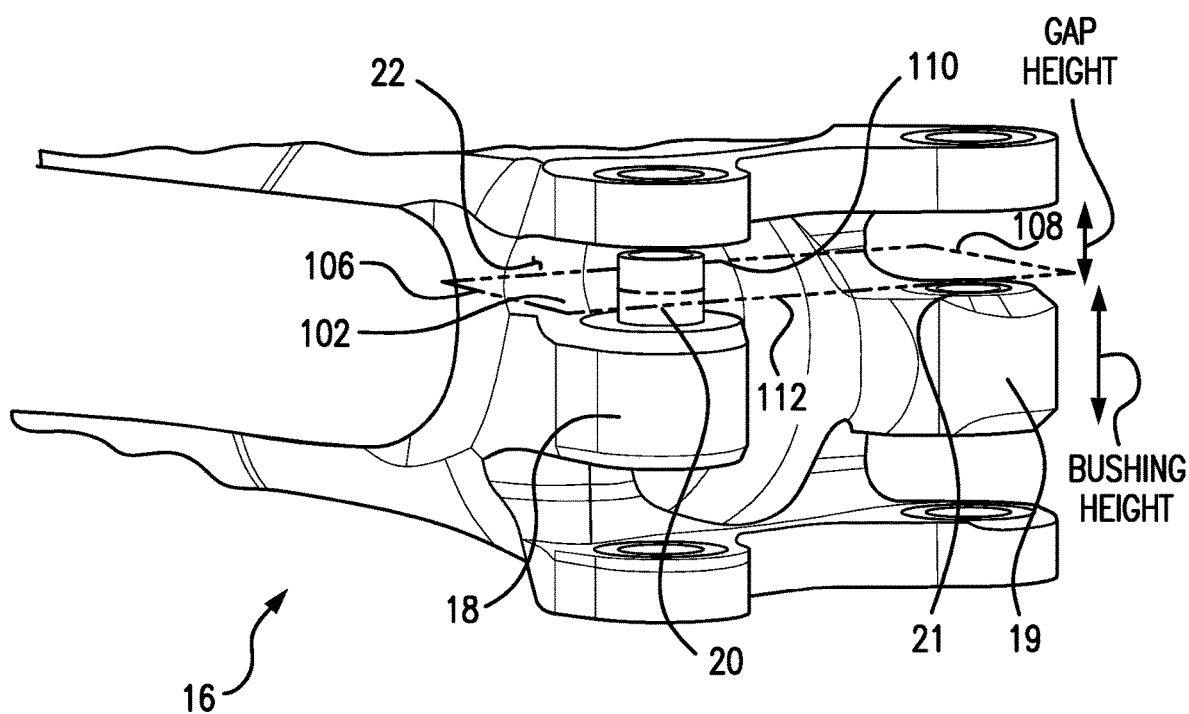
FIG. 2 is a perspective view of the in board end of the blade cuff of FIG. 1, showing a cutting plane defined by the bushing removal tool spaced apart from the blade cuff and intersecting a bushing seated in the blade cuff.

Referring to FIGS. 1 and 2, a rotor blade 10 and tool 100 are shown. Rotor blade 10 includes a blade body 12 with an inboard root portion 14 and a blade cuff 16. Blade cuff 16 is fixed to inboard root portion 14 of rotor blade 10. Blade cuff 16 has a plurality of axially stacked lugs includes two middle lugs, e.g., a first lug 18 and a second lug 19, for connecting rotor blade 10 to a hub of a rotorcraft. Each of the lugs has a bushing seated within the lug for receiving a fastener, a first bushing 20 seated within first lug 18 and a second bushing 21 seated within second lug 19 in the illustrated exemplary embodiment. Because of the geometry of blade cuff 16, first bushing 20 and second bushing 21 each have axial heights that exceed the axial height of gaps adjacent (i.e. above and below) to first lug 18 and second lug 19.

As will be appreciated by those of skill in the art, repair, overhaul, and/or refurbishment of rotor blade 10 can require removal of the bushings, e.g., first bushing 20 and second bushing 21, from blade cuff 16. While adequate working space exists to drive bushings seated in the upper pair of lugs and the lower pair of lugs out of the respective lugs, spacing above and below the is such that first bushing 20 and second bushing 21 can be driven only partially from first lug 18 and second lug 19, at which point each abuts the lug above or below the lug seating the bushing. Accordingly, removal of the bushings from first lug 18 and second lug 19 requires a multi-step operation entailing (a) pressing first bushing 20 bushing partially out of first lug 18 to expose a portion of first bushing 20, (b) removing an exposed portion of first bushing 20 with a cutting tool or saw, and (c) pressing out a remaining portion of first bushing 20. Steps (a)-(c) are repeated to remove second bushing 21 from second lug 19. As will also be appreciated by those of skill in the art in view of the present disclosure, care must be taken during cutting to avoid contacting one or more of a surface 22 (shown in FIG. 2) of blade cuff 16, which may be a polished surface or otherwise engineered to reduce stress risers and managing load transfer between blade cuff 16 and a hub structure.

Referring to FIG. 2, bushing removal tool 100 defines a cutting plane 102. Cutting plane 102 has a first lateral limit 106, an opposed second lateral limit 108, a first axial limit 110 proximate blade cuff 16, and an opposed second axial limit 112 distal from blade cuff 16. Cutting plane 102 is offset from blade cuff 16, does not intersect blade cuff 16, and represents the boundaries of a movement envelope of saw 104 (shown in FIG. 3) when used in cooperation with bushing removal tool 100. As will be appreciated by those of skill in the art in view of the present disclosure, maintaining saw 104 within the boundaries of cutting plane 102 reduces (or eliminates) the risk that saw 104 comes into contact with blade cuff 16 while cutting an exposed portion of first bushing 20. This allows a relatively unskilled or novice technician to separate a segment of first bushing 20 from a segment of first bushing 20 pressed out of first lug 18 and exposed within the gap above first lug 18.

Figure 3:
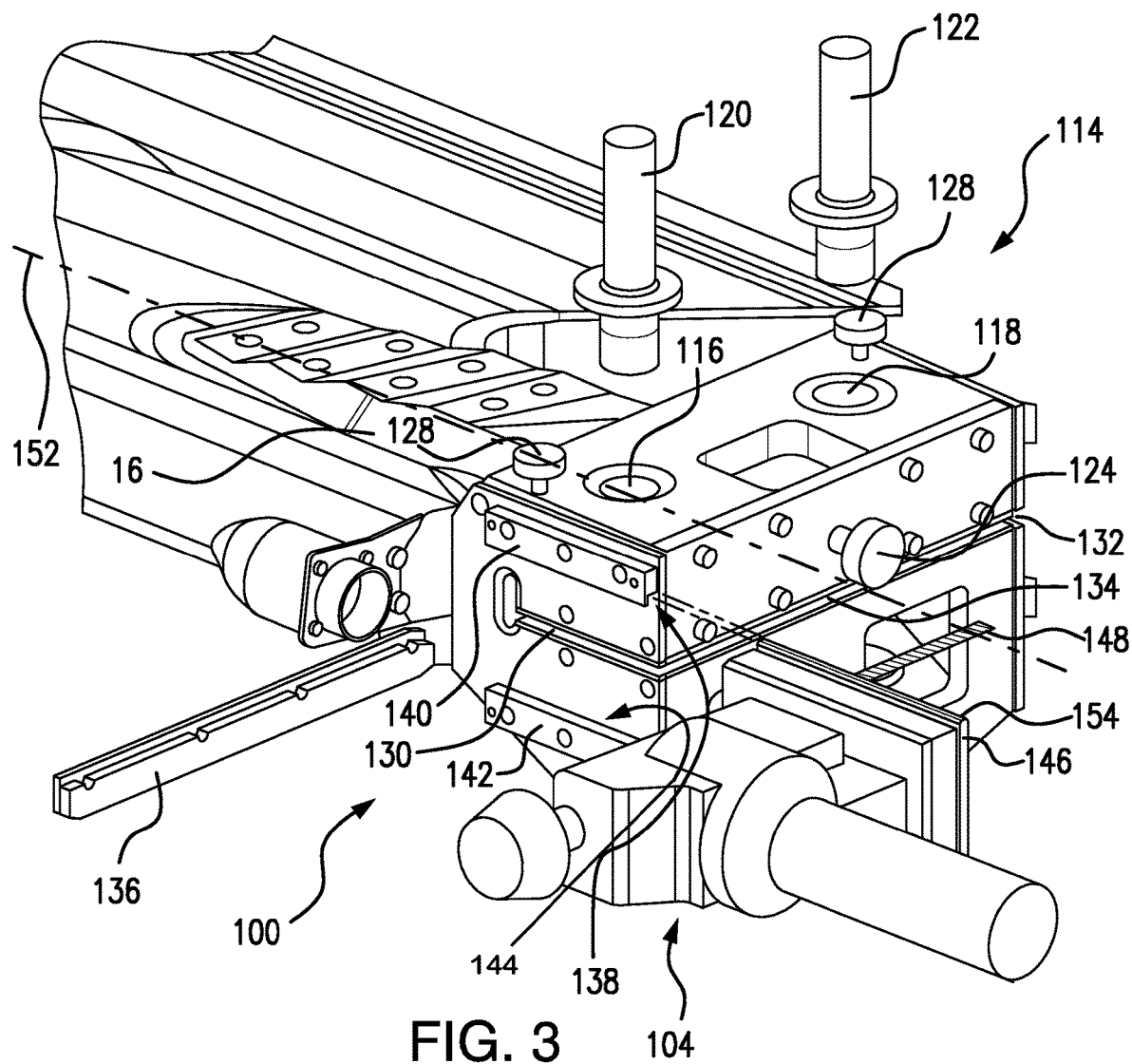
FIG. 3 is a partially exploded view of the tool and blade cuff of FIG. 1, showing the bushing removal tool seated on the blade cuff.

With reference to FIG. 3, cutting plane 102 (shown in FIG. 2) is positioned relative to blade cuff 16 by registering a tool body 114 of bushing removal tool 100 to blade cuff 16. In particular, tool body 114 is positioned over first lug 18 (shown in FIG. 2) and second lug 19 (shown in FIG. 2) such that a first aperture 116 aligns with first lug 18 and a second aperture 118 aligns with second lug 19.

Once tool body 114 is aligned to blade cuff 16, a first reference 120 is inserted into first aperture 116, and therethrough into blade cuff 16, and second reference 122 is inserted into second aperture 118, and therethrough into blade cuff 16. First reference 120 and second reference 122 each include a pin with an end arranged to capture an end of the underlying bushing, thereby fixing a segment of the bushing relative to blade cuff 16 subsequent to cutting. As will be appreciated by those of skill in the art in view of the present disclosure, the pin end arrests the separated portion of the bushing subsequent to being separated from the portion of the bushing seated in the lug. Arresting the separated portion of the bushing prevents the separated bushing portion from falling freely into the clevis surface, potentially damaging the clevis such that further repair work is necessary.

A first locking element 124 and a second locking element 126 are then tightened to fix tool body 114 to blade cuff 16. First locking element 124 is threadably received within tool body 114 longitudinally relative to blade cuff 16. Second locking element 126 (shown in FIG. 1) is threadably received within tool body 114 at an angle relative to first locking element 124. The angle may be a 90-degree angle or any other angle suitable for fixing bushing removal tool 100 relative to blade cuff 16. In the illustrated exemplary embodiment a pair of lateral locking elements 128 are disposed on laterally opposite sides of first reference 120 and second reference 122. The pair of lateral locking elements 128 further secure tool body 114 to blade cuff 16.

Tool body 114 defines a first lateral saw slot 130, an opposed second lateral saw slot 132, and an end saw slot 134. First lateral saw slot 130, second lateral saw slot 132, and end saw slot 134 each provide communication with an interior of tool body 114, and thereby access to blade cuff 16 for saw 104. First lateral saw slot 130, second lateral saw slot 132, and end saw slot 134 are coplanar with one another, end saw slot 134 spanning longitudinal ends of first lateral saw slot 130 and second lateral saw slot 132. Opposite end saw slot 134 a slider bar 136 is slidably received within tool body 114 at longitudinal ends of first lateral saw slot 130 and second lateral saw slot 132. Laterally opposed ends of slider bar 136 extend laterally from tool body 114 to provide a boundary for tool movement across the tool body, slider bar 136 thereby defining a boundary of cutting plane 102 proximate blade cuff 16. Apertures defined within tool body 114 which receive slider bar 136 are intersected by first lateral saw slot 130 and second lateral saw slot 132.

Tool body 114 has a first saw guide 138. First saw guide 138 has a first rail 140 and a second rail 142. First rail 140 and second rail 142 extend in parallel with first lateral saw slot 130, are mounted on opposite sides of first lateral saw slot 130, and longitudinally between end saw slot 134 and slider bar 136. On sides facing first lateral saw slot 130, first rail 140 and second rail 142 define a keyway 144 (shown in FIG. 1) with a profile conforming to a profile of carriage 146. Carriage 146 mounts to saw 104 by inserting carriage 146 into an end of keyway 144 with a saw blade 148 of saw 104 in first lateral saw slot 130. A second saw guide 150 is arranged on a side of tool body 114 opposite first saw guide 138, second saw guide 150 being similar to first saw guide 138 with the difference that second saw guide 150 mirrors first saw guide 138 about a longitudinal axis 152 of blade cuff 16 when bushing removal tool 100 is seated on blade cuff 16.

Figure 4:
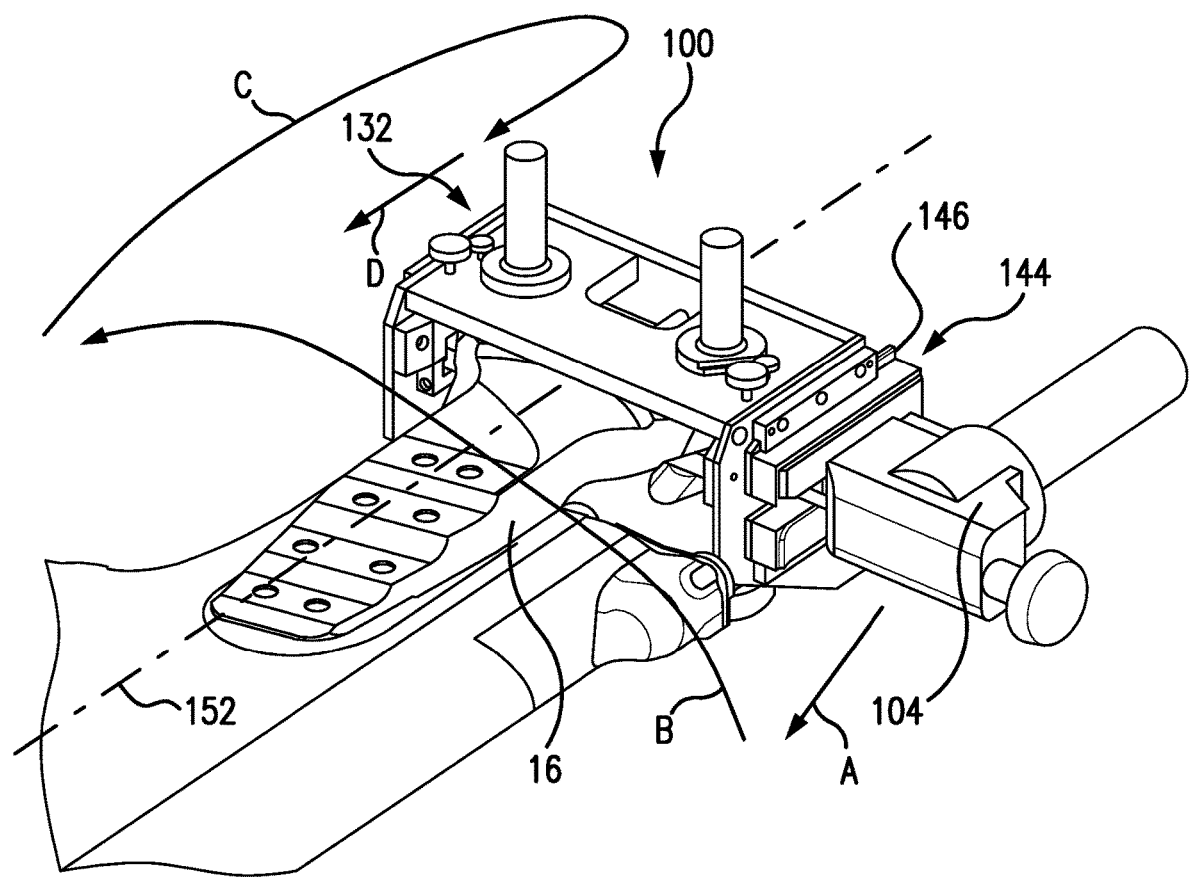
FIG. 4 is a perspective view of the blade cuff and the bushing removal tool of FIG. 1, schematically showing the saw blade traversing saw slots defined on laterally opposite sides of bushing removal tool to cut bushings seated in the blade cuff.

With reference to FIG. 4, carriage 146 slides into an open end 151 (shown in FIG. 1) of keyway 144 (shown in FIG. 1) such that opposed chamfered edges 154 (shown in FIG. 3) of carriage 146 (shown in FIG. 3) are laterally fixed and are longitudinally free within cutting plane 102 (shown in FIG. 2). Saw 104 is then slid across tool body 114 longitudinally in a first movement A towards blade cuff 16, traversing cutting plane 102 and separating a segment of the exposed bushing portion, and optionally coming to rest against slider bar 136. Saw 104 can thereafter be removed from tool body 114, flipped about the longitudinal axis 152 of the blade cuff in a second movement B, and inserted into the second lateral saw slot 132 in a third movement C, and cutting bushing 21 (shown in FIG. 2) in a fourth movement D.

Figure 5:
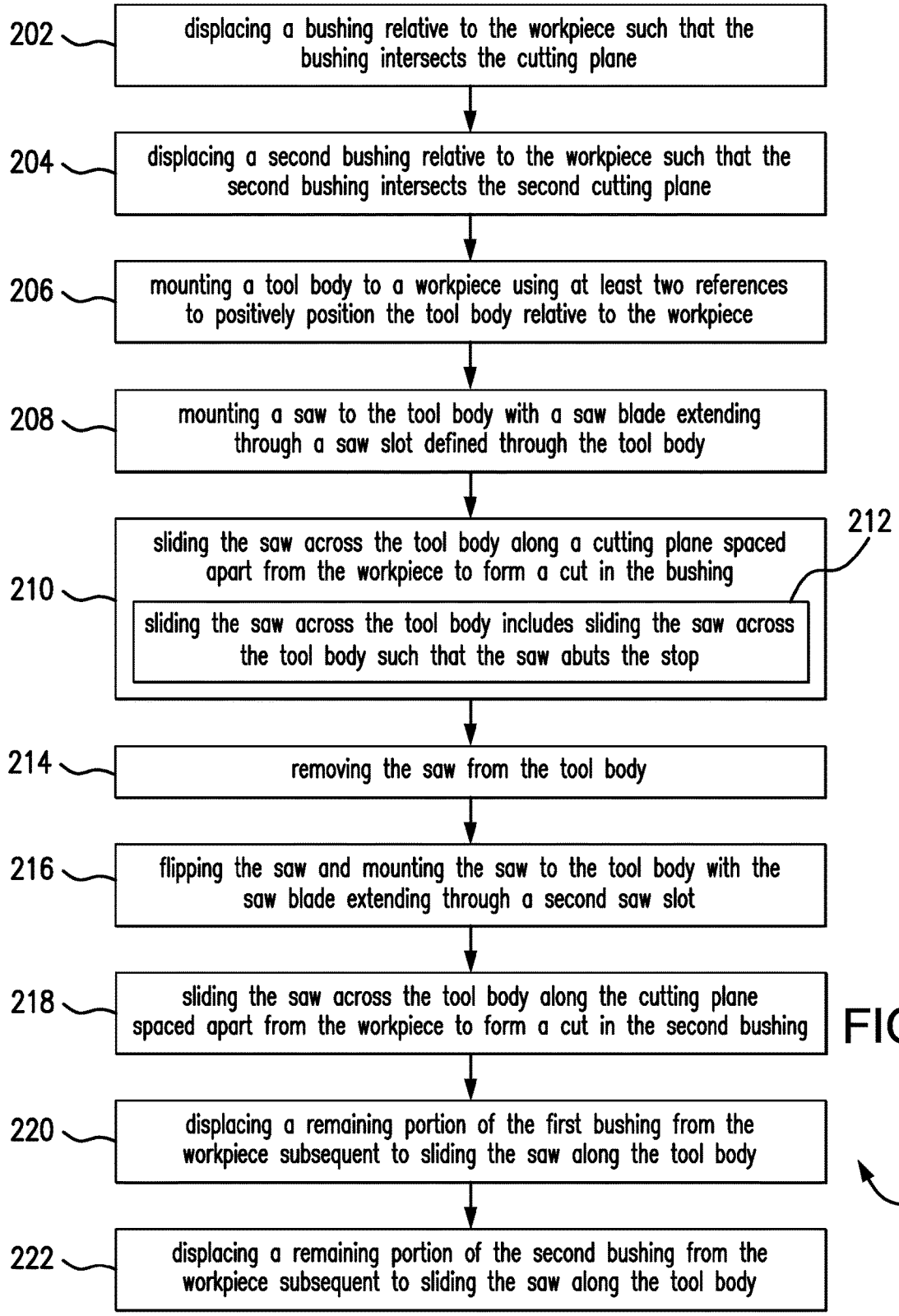
FIG. 5 is a block diagram of a method of removing bushings from a blade cuff, showing steps of the method.

Referring to FIG. 5, a method 200 of removing a bushing, e.g., first bushing 20 (shown in FIG. 2) and second bushing 21 (shown in FIG. 2), from a blade cuff, e.g., blade cuff 16 (shown in FIG. 1) is shown. Method 200 includes displacing a bushing relative to the workpiece such that the bushing intersects a cutting plane, e.g., cutting plane 102 (shown in FIG. 2), as shown with box 202. Displacing the bushing can include pressing out of the blade cuff partially such that a portion of the bushing is exposed, as shown in FIG. 2, and both middle lug bushings can displaced relative to the workpiece such that the second bushing intersects a second cutting plane, as shown with box 204. The second cutting plane can be coplanar with the first cutting plane or, alternatively, can be separate from and parallel to the first cutting plane.

Method 200 also includes mounting a tool body, e.g., tool body 114 (shown in FIG. 1), to a workpiece using at least two references, e.g., first reference 120 (shown in FIG. 1) and second reference 122 (shown in FIG. 1), to positively position the tool body relative to the workpiece, as shown with box 206. Mounting the tool body to the blade cuff can also include locking the tool body in place to the workpiece using locking elements, e.g., first locking element 124 (shown in FIG. 1) and second locking element 126 (shown in FIG. 1). A saw 104 with a saw blade 148, e.g., a reciprocating saw (shown in FIG. 3) with a reciprocating saw blade 148 (shown in FIG. 3), can thereafter be mounted to the tool body. The saw is mounted such that the saw blade extends through a saw slot, e.g., first lateral saw slot 130 (shown in FIG. 3) or second lateral saw slot 132, defined through the tool body, as shown with box 208.

Once mounted, the saw can be slid across the tool body along a cutting plane spaced apart from the workpiece to cut the bushing, as shown with box 210. Sliding the saw across the tool body can include sliding the saw across the tool body such that the saw abuts the stop, e.g., slider bar 136 (shown in FIG. 3), as shown in 212. The saw can then be removed from the tool body, as shown with box 214, flipped about the blade cuff and mounted to the tool body with the saw blade extending through a second saw slot, e.g., second lateral saw slot 132 (shown in FIG. 3), as shown with boxes 214 and 216.

Once positioned in the second saw slot the saw can be again slid across the tool body along the cutting plane to form a cut in a second bushing, as shown with box 218. Thereafter, the tool body can be removed from the blade cuff and remaining portions of the first bushing and second bushing can be removed from the blade cuff, as shown with box 220 and box 222.

The methods and systems of the present disclosure, as described above and shown in the drawings, provide for tools and methods with superior properties including reduced risk of damage to blade cuffs during bushing cutting operations. While the apparatus and methods of the subject disclosure have been shown and described with reference to preferred embodiments, those skilled in the art will readily appreciate that changes and/or modifications may be made thereto without departing from the scope of the subject disclosure.

What is claimed is:
1. A tool for removing a bushing from a rotor blade cuff, comprising:
   a tool body having a reference surface, a first lateral surface extending perpendicularly relative to the reference surface, a second lateral surface opposite the first lateral surface extending perpendicularly relative to the reference surface, and an end surface extending perpendicularly relative to and connected with the reference surface, the first lateral surface and the second lateral surface, a first aperture extends through the reference surface and a second aperture extends through the reference surface, the first aperture being spaced from the end surface by a first distance and the second aperture being spaced from the end surface by a second distance that is equal to the first distance, a first reference is configured to extend into the first aperture and a first lug of the rotor blade cuff and a second reference is configured to extend into the second aperture and a second lug of the rotor blade cuff;

a saw slot extending through the end surface, the first lateral surface and the second lateral surface parallel to the reference surface to provide access to the rotor blade cuff for a saw blade; and a saw guide mounted to the first lateral surface, the saw guide including a first rail arranged on a first side of the saw slot and a second rail arranged in a second side of the saw slot, the first rail being parallel to the second rail, wherein the saw guide is configured to position a saw blade in a cutting plane spaced apart from the rotor blade cuff for removing a segment of a bushing fixed to the rotor blade cuff with reference to the first and second references.

2. The tool as recited in claim 1, wherein each of the first and second references includes a pin, spaced apart from one another, wherein the pins are configured to mount the tool body to the rotor blade cuff with the saw guide positioned for a selected alignment of the cutting plane relative to the rotor blade cuff.

3. The tool as recited in claim 1, further comprising a locking element, angled relative to the first and second references, configured to fix the tool body relative to the rotor blade cuff.

4. The tool as recited in claim 3, wherein the locking element extends along a longitudinal axis of the rotor blade cuff.

5. The tool as recited in claim 3, wherein the locking element defines a locking axis that is orthogonal relative to the cutting plane.

6. The tool as recited in claim 1, wherein each rail forms a keyway with a surface of the tool body open at an end for mounting a saw blade to the tool body by sliding a saw carriage and saw into an end of the keyway.

7. The tool as recited in claim 1, further comprising a slider bar mounted to the tool body and longitudinally spaced apart from the saw slot to define a boundary of the cutting plane.

8. The tool as recited in claim 1, wherein the rotor blade cuff includes an exposed bushing portion extending from the rotor blade cuff, wherein the tool is registered to the rotor blade cuff, and wherein the cutting plane is spaced apart from the rotor blade cuff and intersects the exposed bushing portion.

9. The tool as recited in claim 1, further comprising: another saw guide mounted to the second lateral surface, the another saw guide including a third rail arranged on the first side of the saw slot and a fourth rail arranged on the second side of the saw slot, the third rail being parallel to the fourth rail, wherein the another saw guide is configured to position the saw blade in the cutting plane spaced apart from the rotor blade cuff for removing the segment of the bushing with reference to the first and second references.

10. A bushing removal tool, comprising:
the tool as recited in claim 1; and
a slider bar mounted to the tool body and longitudinally spaced apart from the saw slot to define a boundary of the cutting plane, wherein the rotor blade cuff includes an exposed bushing portion extending from the blade rotor cuff, the tool is registered to the rotor blade cuff, and the cutting plane is spaced apart from the rotor blade cuff and intersects the exposed bushing portion.

11. A system comprising:
a rotor blade cuff including a bushing, a first lug and a second lug; and
a tool for removing the bushing from the rotor blade cuff, the tool including:
a tool body having a reference surface, a first lateral surface extending perpendicularly relative to the reference surface, a second lateral surface opposite the first lateral surface extending perpendicularly relative to the reference surface, and an end surface extending perpendicularly relative to and connected with the reference surface, the first lateral surface and the second lateral surface, a first aperture extends through the reference surface and a second aperture extends through the reference surface, the first aperture being spaced from the end surface by a first distance and the second aperture being spaced from the end surface by a second distance that is equal to the first distance, a first reference is configured to extend into the first aperture and a first lug of the rotor blade cuff and a second reference is configured to extend into the second aperture and a second lug of the rotor blade cuff;

a saw slot extending through the end surface, the first lateral surface and the second lateral surface parallel to the reference surface to provide access to the rotor blade cuff for a saw blade; and a saw guide mounted to the first lateral surface, the saw guide including a first rail arranged on a first side of the saw slot and a second rail arranged in a second side of the saw slot, the first rail being parallel to the second rail, wherein the saw guide is configured to position the saw blade in a cutting plane spaced apart from the rotor blade cuff for removing a segment of the bushing with reference to the first and second references.

12. The system as recited in claim 9, further comprising: another saw guide mounted to the second lateral surface, the another saw guide including a third rail arranged on the first side of the saw slot and a fourth rail arranged on the second side of the saw slot, the third rail being parallel to the fourth rail, wherein the another saw guide is configured to position the saw blade in the cutting plane spaced apart from the rotor blade cuff for removing the segment of the bushing with reference to the first and second references.

\* \* \* \* \*